(No Model.)
D. K. SIMONDS.
WEIGHT INDICATING DEVICE.
No. 588,719. Patented Aug. 24, 1897.
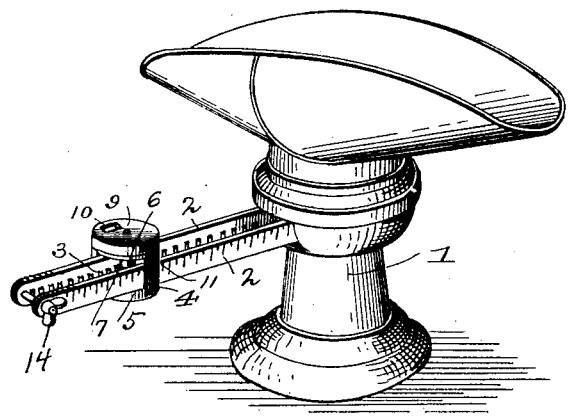
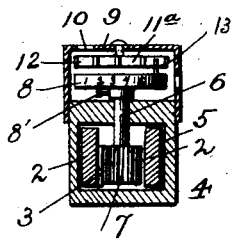
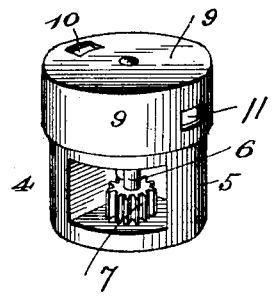
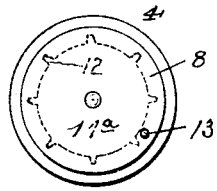
Witnesses
F. L. Durand
A. B. Smith
Inventor
David K. Simonds
By H. B. Willson
Attorney

UNITED STATES PATENT OFFICE.

DAVID K. SIMONDS, OF MANCHESTER, VERMONT.

WEIGHT-INDICATING DEVICE.

SPECIFICATION forming part of Letters Patent No. 588,719, dated August 24, 1897.

Application filed August 15, 1895. Serial No. 559,386. (No model.)

*To all whom it may concern:*

Be it known that I, DAVID K. SIMONDS, a citizen of the United States, residing at Manchester, in the county of Bennington and State of Vermont, have invented certain new and useful Improvements in Weight-Indicating Devices; and I do declare the following to be a full, clear, and exact description of the invention, such as will enable others skilled in the art to which it appertains to make and use the same.

My invention relates to weight-indicating devices of scales.

The object of my invention is to provide a poise which shall be connected to the scale-beams, and when moved back and forth will indicate the amount at which the scale is set for weighing or the amount weighed by the scales, the amount indicated being readily visible to the purchaser as well as the weigher, thus overcoming the difficulty heretofore experienced with the scales in general use, as it is necessary for the weigher to bend over and closely scrutinize the scale-beams before he can ascertain the weight indicated by the scale.

With these objects in view the invention consists in certain features of construction and combination of parts which will be hereinafter fully described and claimed.

In the accompanying drawings, Figure 1 is an illustration of an ordinary counter-scales, showing my invention applied thereto. Fig. 2 is a detail perspective view of the poise removed. Fig. 3 is a top plan view showing the cap removed from the poise. Fig. 4 is a longitudinal vertical sectional view of the poise.

In the drawings, 1 denotes a counter-scale, which is of the usual and well-known construction, having the parallel scale-beams 2, one side of one of which is provided with teeth.

4 denotes the poise, which is supported by the upper edges of these beams and which extends down between the beams. This poise consists of a body 5, having extending through it and journaled therein a shaft 6, the lower end of which is fixed to a cog-wheel 7, which engages the teeth 3 of the beams. Secured to the upper end of the shaft by a set-screw or spring (a set-screw 8' being shown) is a disk 8, which is provided upon its face with an annular row of numerals representing the ounces, progressing from "1" to "16," inclusive. A cap 9 is secured to the upper end of the poise and has a vision-opening 10 in its face through which the numerals on the disk may be read. When this poise is moved back and forth upon the scale-beams, it is evident that the disk will be rotated and the numerals thereon will be successively exposed through the vision-opening in the cap or cover of the poise by reason of the cog-wheel carried by the poise engaging the teeth 3 of the scale-beams. Thus the weigher may readily ascertain the amount weighed by the scales or the amount at which he desires to set the scales, as the case may be.

If desired, a vision-opening 11 may be formed in the side of the cap of the poise and the disk be provided upon its edge with numerals corresponding to those upon its face, so that the customer or purchaser may also see the amount of the weight indicated. If desired, a second disk $11^a$ may be provided to indicate the pounds.

Any suitable mechanism may be provided whereby the pound-disk may be caused to turn a distance of one space for each complete revolution of the ounce-disk. Inasmuch as the pound-disk may be removed, and in practice such disk would probably not be necessary, I do not illustrate any operating mechanism for said pound-disk.

In order to compensate for the wear of the gearing and to keep the poise in proper relation with respect to the beams, I have provided the free ends of the beams with a screw 14, which may be tightened or loosened, as the case may be, for the purpose of properly setting the poise.

Having thus described my invention, what I claim, and desire to secure by Letters Patent, is—

The combination with two parallel scale-beams, one of which is provided on its inner side with teeth, of a poise having an opening, through which the scale-beams pass, a vertical shaft journaled in the poise, a pinion on the lower end of the shaft and engaging the teeth on the scale-beam, a disk provided with indices mounted on the upper end of the shaft, and a cap fitting upon the poise over the disk and provided with an opening in line with the indices on the disk, all as described.

In testimony whereof I affix my signature in presence of two witnesses.

DAVID K. SIMONDS.

Witnesses:
GEORGE L. TOWSLEY,
C. R. HEMENWAY.